Dec. 30, 1941.    N. CHIRELSTEIN    2,267,816
CUBE TAP AND THE LIKE
Filed Jan. 16, 1941    2 Sheets-Sheet 1
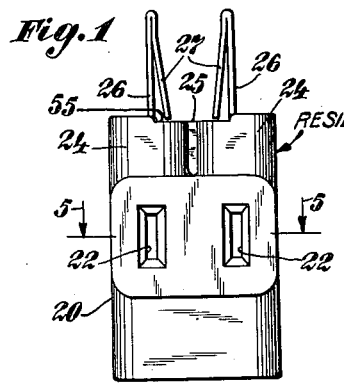
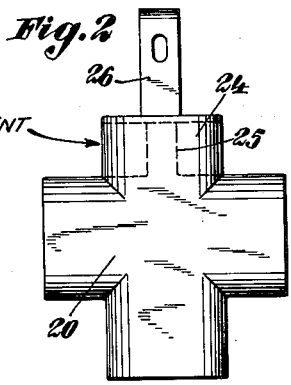
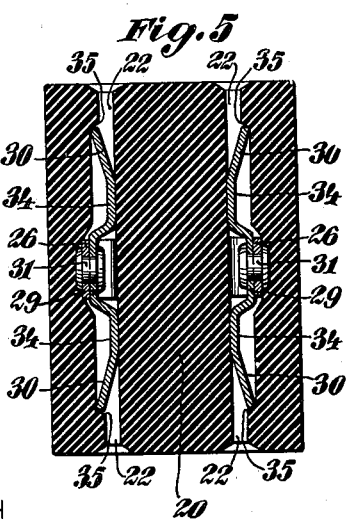
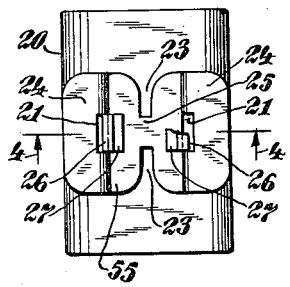
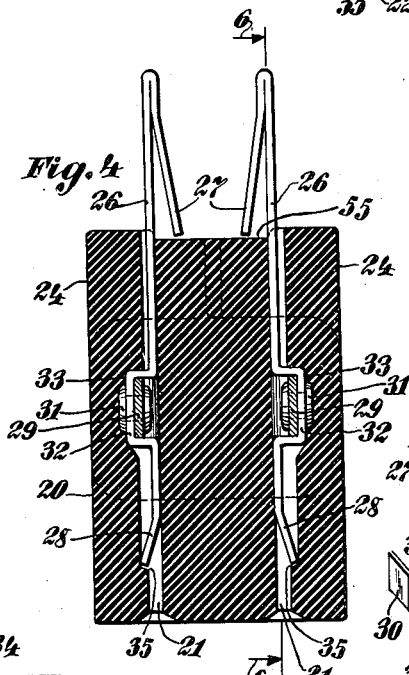
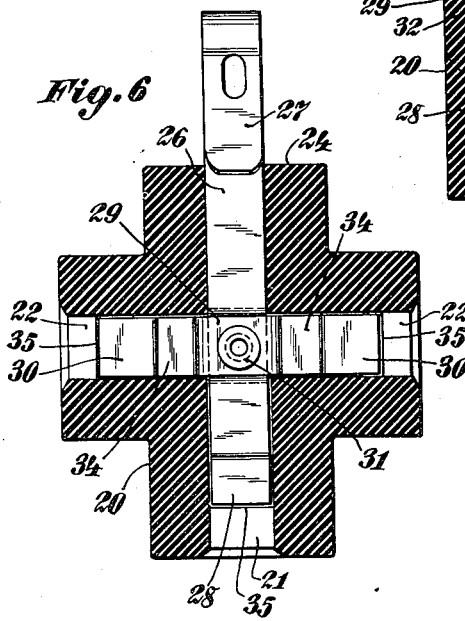
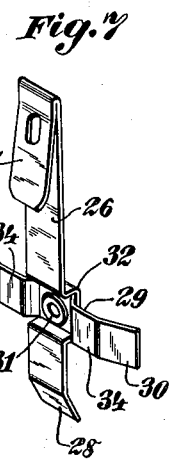
Nathan Chirelstein,
INVENTOR.
BY
ATTORNEY.

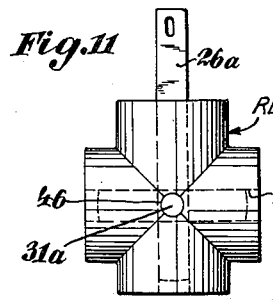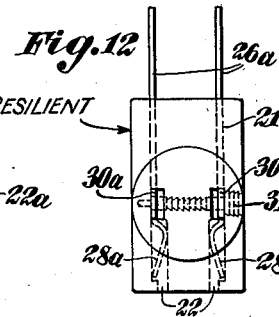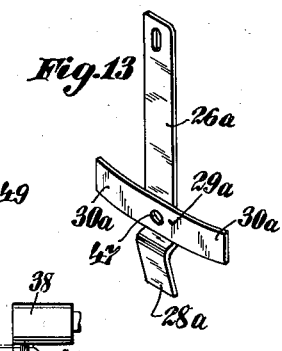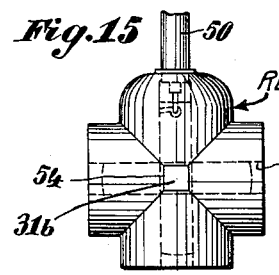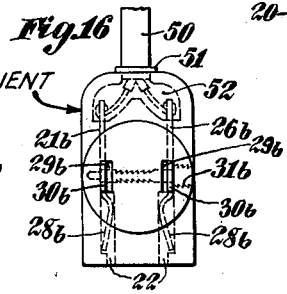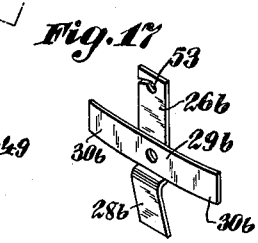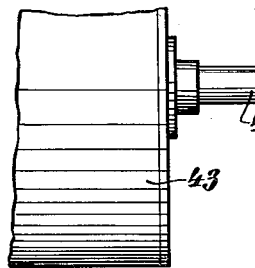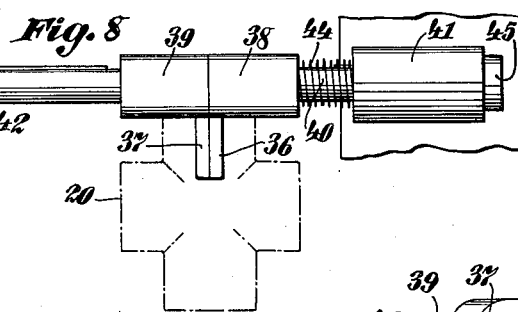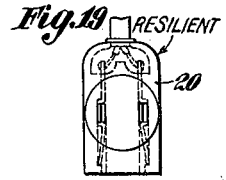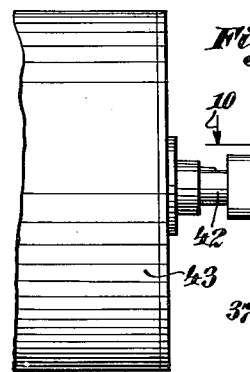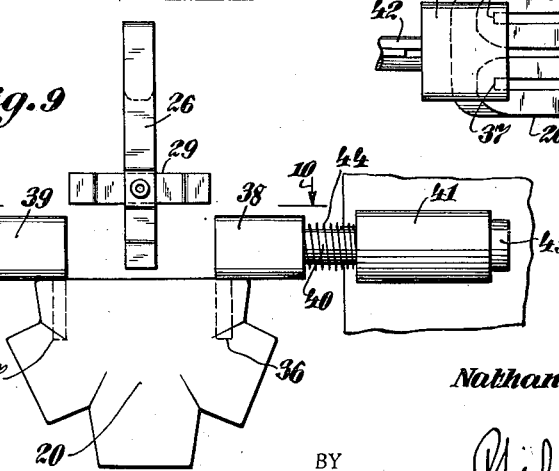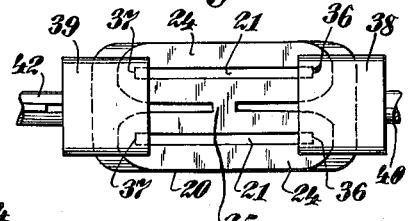

Patented Dec. 30, 1941

2,267,816

UNITED STATES PATENT OFFICE 2,267,816

CUBE TAP AND THE LIKE

Nathan Chirelstein, Maplewood, N. J.

Application January 16, 1941, Serial No. 374,612

1 Claim. (Cl. 173—334)

The invention here disclosed relates to improvements in the nature of cube taps and other forms of circuit extension devices.

Special objects of the invention are to provide an electric fitting in the nature of a cube tap, in which the contacts may be readily mounted, which can be produced at low cost, which will possess high insulating qualities and which will be of such a character as not to be easily broken even with rough or careless handling.

The foregoing and other desirable objects are attained by novel features of construction, combinations and arrangements of parts, all as hereinafter described, illustrated in the accompanying drawings and broadly covered in the claim.

The drawings accompanying and forming part of this specification illustrate different practical embodiments of the invention and certain present modes of assembly. The structural and other features, however, may be modified and changed as regards this disclosure, all within the true spirit and scope of the invention as hereinafter defined and claimed.

Figure 1 is an edge view of a resilient cube tap, embodying the invention; Figure 2 is a front face view of the same; Figure 3 is an end view; Figs. 4, 5 and 6 are enlarged sectional views; Figure 4 as on line 4—4 of Figure 3, Figure 5 as on line 5—5 of Figure 1 and Figure 6 as on line 6—6 of Figure 4.

Figure 7 is a perspective view of one of the two combination contact members used in this first illustrated form of the invention; Figs. 8 and 9 are broken and somewhat diagrammatic views illustrating the feature of stretching the body of the cube tap open to admit the contact elements; Figure 10 is a view as on line 10—10 of Figure 9, illustrating the opening of the tap body by the stretching fingers; Figures 11 and 12 are front and edge views respectively of another form of the cube tap; Figure 13 is a perspective view of one set of the contacts shown in this form of the invention; Figure 14 is a side view of the pin or plug employed in this form of the invention for securing the two sets of contacts in position.

Figures 15 and 16 are front and edge views respectively of an embodiment of the invention in the form of a cord extension fitting.

Figure 17 is a perspective view of the contacts employed in such embodiment.

Figure 18 is a side view of the contact securing pin employed in this third form of the invention.

Figure 19 is an edge view of the form of connector like that shown in Fig. 16, but not using a contact securing pin.

Figure 20 is a broken diagrammatic view illustrating operation of a form of the spreader fingers for opening up the cord extension form of fitting illustrated in Figs. 16 and 19.

The first embodiment of the invention, illustrated in Figures 1 to 10, comprises a resilient body 20 of insulating material, molded with passages for the contacts and so constructed that it may be stretched open far enough to receive such contacts.

In the example shown, the block of resilient material is molded with two substantially parallel longitudinal passages 21, 21 and with two substantially parallel transverse passages 22, 22, intersecting the first-mentioned passages substantially at the center of the block.

At the top or blade end of the body, some of the material is removed, as at 23, Figures 1 and 3, to more or less separate the material about the ends of the two longitudinal or main passages 21. This leaves the material about each of such passages as an individual pier 24 which may stretch to an extent unhampered by the other pier. Preferably the two piers are not entirely disconnected but are left connected at the center by a narrow bridge 25 of the elastic base material and which may serve at times as a spreader to hold the piers and the blade ends projecting therefrom properly spaced apart, against an external compressing or squeezing pressure.

The contacts are shown as consisting of two long strips 26 each having a projecting reversely folded blade extension 27 at one end and an inclined contact portion 28 at the opposite end, and two shorter strips 29 having inclined contact areas 30 at opposite ends, the short strips being secured in crossing relation over the inner portions of the longer strips, as by tubular rivets 31 or other suitable means.

To locate the one strip over the other and at the same time provide an anchorage in the base, each of the long strips is shown as having an angular offset 32 therein of a width substantially equal to the width of the shorter strip, forming a seat for the latter and acting also as a lateral projection engaging in a laterally extended or offset chamber 33 molded as a part of the longitudinal passages 21.

The short and wholly enclosed cross strips 29 are showed as bowed at 34 at opposite sides of their centers into the same general plane as the long strips 26, thus to bring the enclosed inclined contact ends 28, 30 of both strips into the same positions in respect to the contact blades that may be plugged into the unit.

As shown in the sectional views, Figures 4, 5 and 6, the blade receiving ends of the passages 21 and 22 preferably are thinned or closed in over the inclined ends of the contacts, thus to provide the shoulders 35 overstanding the ends of such inclined contact portions, said shoulders assisting in locating the contacts and also serving as guards to prevent external pressure from forcing the rubber or other resilient material back in such a way as to expose the enclosed ends of the contacts.

While at present it is most practical to make the compound contacts of two separate preformed strips riveted together in the cruciform relation shown, it is realized that these contacts might in some circumstances be integral pieces in this shape stamped out of sheet metal.

Figures 8, 9 and 10 show how the resilient tap body may be opened up to admit the contact members by means of two pairs of spreader fingers 36, 36 and 37, 37, disposed to enter the projecting blade ends of the longitudinal passages 21.

In the machine illustrated the separate fingers of each pair are mounted on relatively separable heads 38, 39, the first carried by a rod 40 slidingly keyed in a bearing 41 and the other carried by a piston rod 42 connected with a piston operating in an air cylinder 43.

The spreader fingers preferably are of a length to enter the longitudinal passages 21, to the intersection of the cross passages 22 so that with the separation of the two heads, Figure 9, the two sets of fingers will stretch the passages 21 to the extent of slots, Figure 10, sufficiently wide to admit the cross bars 29. With the passages held open to such extent, the cruciform contacts 26—29 can then be entered by hand or otherwise, between the separated heads into the fully seated relation, whereupon pressure in the cylinder 43 may be released to permit the expanded plug body to close over the contacts. In such closing action the opposite ends of the transverse passages 22 will contract over the ends of the cross bars 29, thus to properly locate these, as well as the longitudinally extending bars.

To prevent injury to the longitudinal bars 26 which at the time are then interposed between the heads 38, 39, the head 38 may be backed up by a spring 44, interposed between that head and the support 41, which will cushion the effect of such closing blow. Other means for cushioning the closing action on the contact bars may be provided or the closing action may be automatically stopped at a point where the interposed contact bars will not be caught between the opposed heads. After the resilient body is permitted to close to such extent over the contacts, the base with the contacts located and to such extent "embedded" within the body may be simply slipped off the spreading fingers or prongs, possibly with a slight twisting action to release the blades 26 from in between the two heads. The stop shoulder 45 on the outer end of the rod 40 by engagement with the outer end of the bearing support 41 limits the inward movement of the head 38 under pressure of the spring 44 to the proper position, Figure 8, for the next base to be slipped over the spreading prongs.

The resiliency of the base is a protection against injury from rough or careless handling. Also, it gives to the contacts an additional spring quality, enabling the projecting blades to firmly fit the contacts of receptacles which may vary slightly in size or spacing of contacts. The entrances in the other three sides or faces of the tap body may be of a size to closely fit the entered blades of attachment plugs joined to the tap, thus to serve as means for resiliently coupling added attachment plugs to the tap. These close fitting resilient inlets also wipe the blades being entered in or removed from the cube tap, thus assuring at all times, good electrical contact between the associated elements.

The invention may be carried out in other forms.

Thus, as shown in Figures 11 to 14, the long and the short contact strips 26a and 29a may be separately entered in the longitudinally and transversely extending passages 21a and 22a and be pinned together in such relation as by a cross stud 31a of insulating material forced or driven in through a pre-formed passage 46, said pin extending through registering openings 47 in the crossed contacts of each pair and held in this relation as by corrugations or teeth 48, 49 on the pin biting into the resilient material of the base.

This construction has the advantage that the base does not have to be stretched open to receive the contacts, requiring only that the two sets of contacts be pushed through the molded passages into their final positions and then be anchored in that relation by the cross key; the latter, plus the resiliency of the base holding the transverse bars in firm mechanical and electrical engagement with the longitudinal contact bars.

Figures 15 to 18 show how the invention may be applied to other types of circuit extending devices such as an extension plug on the end of a circuit cord 50.

The resilient base in this particular case resembles the cube tap except that in place of the extending blades it has a port 51 to receive the end of the cord and an internal chamber 52 for the wires of the cord which are connected to the ends of the main or longitudinally extending blades 26b. The latter as shown in Figures 17 may be notched at 53 to have the ends of the cords soldered or otherwise secured thereto.

The insulating anchoring pin 31b is shown in this instance as of flat sided or substantially square cross section and the opening 54, Figure 15, for the same as similarly shaped to prevent any turning movement of the pin. Otherwise, it may be substantially the same in structure and function as the anchoring pin last described.

In assembling the Figure 15 form of the invention, it may be practical to first solder or otherwise secure the ends of the main blades 26b to the ends of the wires and then after stretching the cord opening 51 in the end of the body, to force these blades through the chamber 52 into seated positions in the longitudinal passages 21b, after which the transverse blades 29b may be forced into place in passages 22b and the securing pin 31b forced in through the side of the body. If considered desirable, an insulating cement or other medium may be employed for sealing and securing the anchoring pin in place.

The bridge 25 which provides the abutment between the blade supporting piers 24, in the first form of the invention, being of the same resilient material as the body of the block may yield so as not to interfere with the stretching of the pier portions. That part of the end face of the block between the projecting portions of the contact blades may be reduced or lowered as indicated at 55, in Figs. 1 and 4, so as to provide clearance for the return bent spring end portions 27 of the blades. The contact bars or strips may be made slightly larger than the molded passages, so as to be firmly gripped and held by the body of elastic material.

Fig. 19 illustrates a form of the cord extension fitting generally similar to the one shown in Figs. 15 and 16, but omitting the contact securing pin 31a, 31b, and relying on the resilient gripping effect of the plug body to hold the crossed contact bars 26b, 29b in firmly engaged electrically connected relation. The passages are preferably so formed and the contact strips so located therein that engagement of inserted attachment blades will have the effect of forcing the crossed contact strips all the more firmly together.

With the chambered form of plug body illustrated in Figs. 15, 16 and 19, some form of spreader may be desirable to fully open up the chamber for reception of the contact strips. Such a spreader is shown in Fig. 20, the same differing from the one illustrated in Figs. 8 and 9, particularly in having the spreader fingers 36a, 37a, formed at the base with rounded enlargements 56, to force back and open up the reduced cord passage at 51, in the end of the plug. With such form of spreader, this type of plug may be stretched open sufficiently to receive crossed contact strips which are permanently secured together, of the type illustrated in Fig. 7.

What is claimed is:

An electrical device of the character disclosed, comprising a base of resilient insulating material having molded passages extending longitudinally through opposite ends of the same and molded passages extending transversely through opposite sides of the same and intersecting said longitudinal passages, unitary combination longitudinal and transverse contacts to fit in said intersecting longitudinal and transverse passages, said unitary combination contacts consisting each of a longitudinal contact strip and rigidly attached contact arms projecting to the opposite sides of the same, the material surrounding and forming the longitudinal passages at one end of said base being segregated and said base material at said end being thereby stretchable transversely of said longitudinal passages an amount at least equal to the full extent of said transverse contact arms, whereby to receive said longitudinal contact strips with the attached outstanding transversely projecting contact arms and whereby when said longitudinal passages are stretched transversely open at said one end of the base, the longitudinal contact strips carrying the transverse contact arms may be used as handles to insert and position the unitary combination contacts into fully seated relation in the stretched base with the transversely extending contact arms in alignment with the transverse passages and so that upon release of the stretching force, the transverse extending passage portions of the base will collapse over the so positioned transversely projecting contact arms of the unitary contacts to lock said combination contacts properly positioned in said intersecting longitudinally and transversely extending passages.

NATHAN CHIRELSTEIN.